United States Patent [19]

Hoover et al.

[11] Patent Number: 6,006,255
[45] Date of Patent: Dec. 21, 1999

[54] NETWORKED COMPUTER SYSTEM AND METHOD OF COMMUNICATING USING MULTIPLE REQUEST PACKET CLASSES TO PREVENT DEADLOCK

[75] Inventors: Russell Dean Hoover, Rochester; George Wayne Nation, Eyota; Kenneth Michael Valk, Rochester, all of Minn.

[73] Assignee: International Business Machines Corporation, Armonk, N.Y.

[21] Appl. No.: 08/628,598

[22] Filed: Apr. 5, 1996

[51] Int. Cl.⁶ .................................................. G06F 13/00
[52] U.S. Cl. ............................................................ 709/216
[58] Field of Search ........................ 395/200.3, 200.31, 395/200.36, 200.42, 200.43, 200.44, 200.45, 200.46, 200.67, 670, 677; 709/216, 225, 400; 711/141, 146

[56] References Cited

U.S. PATENT DOCUMENTS

| | | | |
|---|---|---|---|
| 5,016,167 | 5/1991 | Nguyen et al. | 346/200 |
| 5,036,459 | 7/1991 | den Haan et al. | 709/237 |
| 5,133,074 | 7/1992 | Chou | 395/725 |
| 5,182,808 | 1/1993 | Bagnoli et al. | 395/725 |
| 5,303,362 | 4/1994 | Butts, Jr. et al. | 711/121 |
| 5,317,737 | 5/1994 | Barton | 395/650 |
| 5,408,613 | 4/1995 | Okabayashi | 395/275 |
| 5,442,763 | 8/1995 | Bartfai et al. | 395/375 |
| 5,444,701 | 8/1995 | Cypher et al. | 370/60 |
| 5,452,287 | 9/1995 | DiCecco et al. | 370/17 |
| 5,471,623 | 11/1995 | Napolitano, Jr. | 395/200.03 |
| 5,522,058 | 5/1996 | Iwasa et al. | 711/145 |
| 5,581,705 | 12/1996 | Passint et al. | 709/200 |
| 5,613,071 | 3/1997 | Rankin et al. | 707/10 |
| 5,617,537 | 4/1997 | Yamada et al. | 709/214 |

FOREIGN PATENT DOCUMENTS 0 294 890 A2  12/1988  European Pat. Off. .

OTHER PUBLICATIONS

IBM Technical Disclosure Bulletin, vol. 29, No. 11, Apr. 1987, pp. 4782–4786.

Daniel Lenoski et al., "The Stanford Dash Multiprocessor", *Computer*, IEEE, Mar. 1992, pp. 63–79.

*Primary Examiner*—Moustafa M. Meky
*Attorney, Agent, or Firm*—Scott A. Stinebruner; Karuna Ojanen

[57] ABSTRACT

A networked computer system and method of communicating classify request packets into multiple classes, with one class devoted to non-propagable requests that may be handled locally by destination nodes in the computer system. The multiple classes of requests are separately handled in the networked computer system such that an inability of a node to handle a request in another class does not hinder the ability of the node to process non-propagable requests, thereby avoiding deadlocks in the computer system.

20 Claims, 5 Drawing Sheets

NETWORKED COMPUTER SYSTEM AND METHOD OF COMMUNICATING USING MULTIPLE REQUEST PACKET CLASSES TO PREVENT DEADLOCK

FIELD OF THE INVENTION

The invention generally relates to networked multiprocessor or distributed computer systems having a plurality of nodes interconnected via a network. More particularly, the invention relates to networked multiprocessor or distributed computer systems which utilize packet-based communication between nodes.

BACKGROUND OF THE INVENTION

Multiprocessor, or parallel processing, computer systems rely on a plurality of microprocessors to handle computing tasks in parallel to reduce overall execution time. Originally, many multiprocessor systems interconnected a plurality of processors to a single bus, commonly referred to as a multidrop bus, which required each processor to connect up with every line in the bus.

However, it has been found that bus traffic may be limited because every communication between processors passes through the common bus. Moreover, it may be desirable to provide different processors on different boards or in different enclosures, which often makes it impractical to couple each processor to a common bus.

Because of these drawbacks, networked multiprocessor systems have also been developed, which utilize processors or groups of processors connected to one another across a network and communicating via "packets" or messages. Each processor or group of processors in these systems operates as a "node" in a network, and is only connected to one or more other nodes such that messages may be required to pass through one or more nodes to reach their destination. Among other benefits, the connection of nodes and the addition of new nodes is greatly facilitated since a node need only be connected to one or more other nodes in the network. Also, network bandwidth increases since different packets may be simultaneously transmitted between different sets of nodes.

While much of the focus herein will be devoted to multiprocessor systems, it should be appreciated that the concept of distributing tasks between processors in multiprocessor systems may also be applied to distributed computer systems which distribute tasks between different computers in a networked environment (e.g., a LAN or WAN). Further, many of the functions and problems associated with multiprocessor and distributed computer systems are quite similar and equally applicable to both types of systems. Consequently, the term "networked computer system" will be used hereinafter to describe both systems in which the nodes are implemented as individual microprocessors or groups of processors (multiprocessor systems) or as individual computers which may separately utilize one or more processors (distributed computer systems).

One specific example of a networked multiprocessor system is the DASH (Directory Architecture for Shared memory) multiprocessor system, which includes a plurality of nodes or clusters interconnected via a mesh network. Each node includes a plurality of processors coupled to a local bus, along with a portion of the shared memory for the system. A network interface in each node handles memory requests to other nodes, and a directory in each node is used to monitor the status of local copies of the memory stored in caches in various processors in the system.

One significant problem that exists with many networked computer systems is that of deadlock, where nodes may in effect "lock up" due to an inability to pass packets or messages to other nodes. For example, a node, after sending a request to another node, may be required to wait for a response from the other node. While waiting for the response, the node may not be capable of receiving requests from other nodes, thereby halting the operation of other nodes in the system.

The DASH system addresses this problem (referred to as request-reply deadlock) by classifying packets in different classes (one for requests and one for responses), and by having separate networks, buffers and processing circuitry for handling the different packet classes. Consequently, even though a node may be waiting for a response, it may still process requests that are received while it is waiting for the response.

However, it has been found that another form of deadlock, request—request deadlock, may also occur in multiprocessor systems. In particular, in some networked computer systems, sending a primary request to another node may result in the receiving or destination node sending out one or more secondary requests, e.g., to notify other nodes having local copies of a memory block that the block has been modified (often referred to as "invalidation" requests). However, if one or more secondary requests cannot be sent by the destination node, the node may block receipt of new requests from other nodes. This may result in two nodes each waiting for responses from the other.

For example, FIG. 1 shows a networked computer system with three nodes A, B and C (numbered 2, 4 and 6). If node A sends a primary request to node B, node B may send a secondary request to node C. Before node B can send a response to node A, however, it must wait for a response from node C. If, however, node C has also sent a primary request to node B, node B may refuse to accept the request from node C because it is still processing the node A request. But since node C has sent a request to node B, it may also not accept the secondary request from node B. At this point, both nodes B and C are waiting for a response from the other before they will accept and process the pending requests, thereby resulting in deadlock in the system, which it will be noted propagates to the other nodes in the system (e.g., node A, since it waits for a response from node B).

The DASH system addresses this problem by having nodes reject requests (send responses to the effect that the requests were refused and must be retried) whenever they are incapable of receiving requests. However, rejecting requests raises another problem that is somewhat unique to multiprocessor systems—that of ordering. In particular, it is extremely important in multiprocessor systems for commands or requests to complete in the order in which they were sent. Thus, if a string of requests is sent to a destination node, and one of the requests is rejected, the system cannot permit other requests that follow the rejected request to be processed before the rejected request, even if the destination node becomes able to process them.

The conventional manners of addressing this problem are to either send requests one at a time (i.e., waiting for a response before sending a next request), or by detecting rejected requests and subsequently rejecting each subsequent request in a chain to force the requesting node to resend all of the requests from the point of the first rejected request. The former, however, effectively serializes the communication between nodes, and significantly degrades performance. Further, the latter requires complicated logic for handling rejected requests at the destination node due to the requirement of identifying and isolating requests in a particular chain from a particular node.

Other networked computer systems attempt to address the request—request deadlock problem; however, to date, none have been capable of adequately ensuring proper ordering without the use of additional complex and performance-limiting processing. Therefore, a substantial need continues to exist for a networked computer system and method of communicating which avoids request—request deadlock without compromising system ordering or system performance.

SUMMARY OF THE INVENTION

The invention addresses these and other problems associated with the prior art in providing a networked computer system and method of communicating wherein at least a portion of the commands passed between nodes, e.g., requests, are classified in multiple classes, with one class devoted to non-propagable commands that may be handled locally by destination nodes in the computer system. The multiple classes of commands are separately handled in the networked computer system such that an inability of a node to handle a command in one class does not hinder the ability of the node to process commands in other classes.

By a "non-propagable command", what is meant is a command that may be processed locally by a destination node and that does not require additional processing from other nodes in the system. This ensures that no further (secondary) commands will need to be generated by the destination node in response to receiving a non-propagable command. Thus, the destination node can always accept a non-propagable command with no risk of deadlock resulting therefrom.

In preferred embodiments, the commands are communicated via packets, with three packet classes being utilized: a first for primary requests, a second for secondary (non-propagable) requests and a third for responses. Further, three separate sets of buffers or queues are maintained for each node, with each set of buffers handling one packet class. With a dedicated set of buffers for each class, a blockage for one packet class will not affect communication of the classes. The resulting preferred networked computer systems thereby avoid request—request deadlock situations without compromising system ordering or performance.

Therefore, in accordance with one aspect of the invention, a method is provided for communicating between a plurality of nodes in a networked computer system. The method includes the steps of classifying request packets in one of at least first and second classes, wherein the request packets in the second class are non-propagable requests that are handled locally by destination nodes in the computer system; and separately processing request packets in the first and second classes; whereby request packets in either class are accepted by a node irrespective of whether the node is accepting packets in the other class.

According to a further aspect of the invention, a node is provided for use in a networked computer system which includes a plurality of nodes interconnected via a network to pass request packets therebetween. The request packets are classified into first and second classes, with the request packets in the second class being non-propagable requests that are handled locally by destination nodes in the computer system. The node includes a network interface, coupled to the network, for receiving request packets therefrom; and a command processor, coupled to the network interface, for processing request packets received by the network interface, the command processor separately handling request packets in the first and second classes such that request packets in the second class are processed irrespective of whether the command processor is accepting request packets in the first class.

In accordance with another aspect of the invention, a networked computer system is provided including a plurality of nodes interconnected via a network. Each node includes a first set of buffers for storing a first class of command packets; a second set of buffers for storing a second class of command packets; and a command processor, coupled to the first and second sets of buffers, for processing command packets. The command processor separately handles command packets in the first and second classes such that command packets in the second class are processed irrespective of whether the command processor is accepting command packets in the first class.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described preferred embodiments of the invention.

DETAILED DESCRIPTION OF THE PREFERRED EMBODIMENTS

Figure 2:
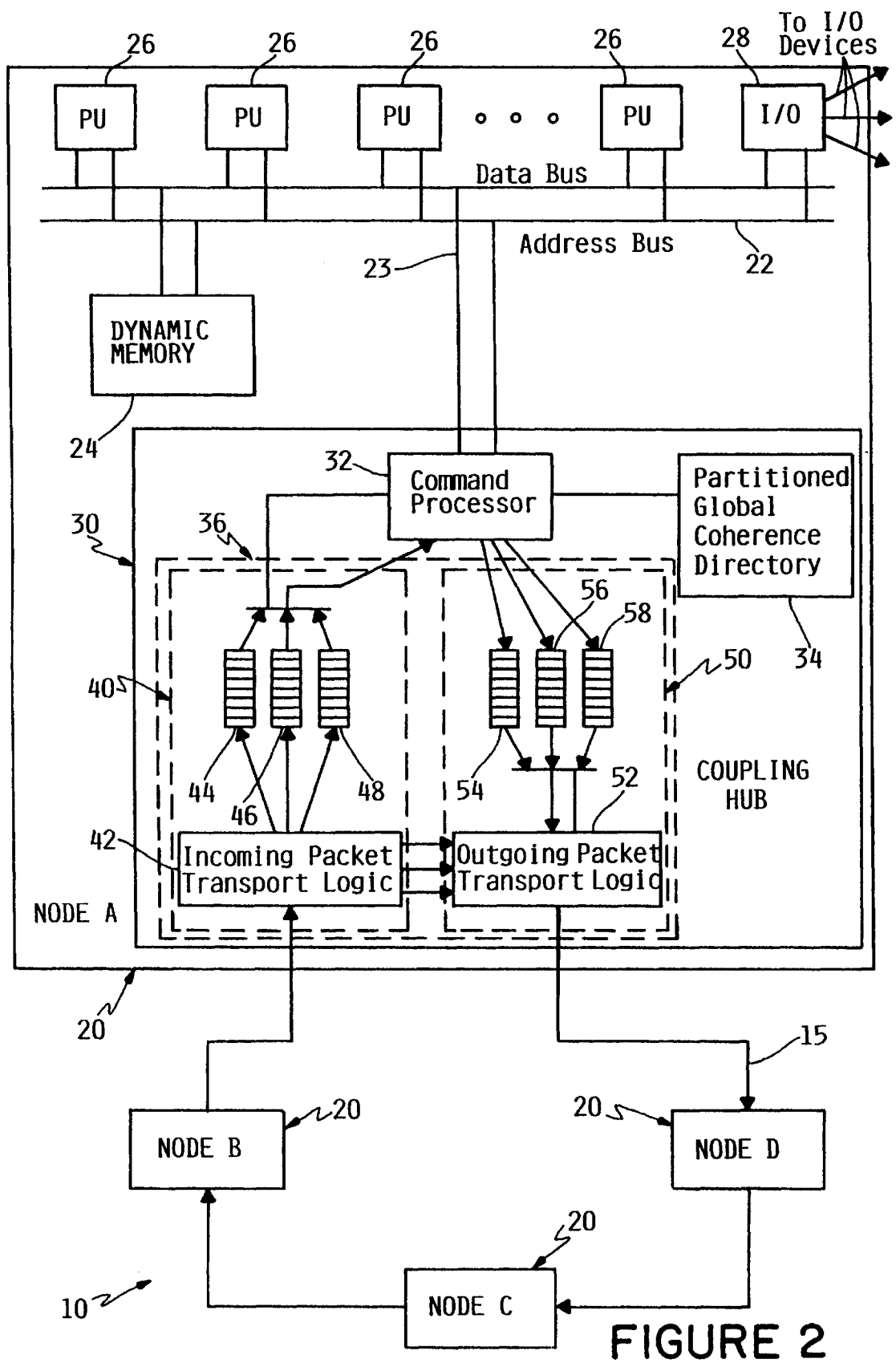
FIG. 2 is a functional block diagram of a preferred networked computer system consistent with the principles of the present invention.

Turning to the Drawing, wherein like numbers denote like parts throughout the several views, FIG. 2 illustrates a preferred networked computer system 10 consistent with the principles of the present invention. Generally, system 10 includes a plurality of nodes 20, e.g., nodes A–D, interconnected via multinode network 15.

Network 15 is preferably a packet-based network that is shown in FIG. 2 in a token ring configuration, wherein each node receives information from one node and transmits information to one other node. However, it should be appreciated that network communication may be handled in any known manner, and that the network may implement any known topology, e.g., star, crossbar, mesh, fully connected, hypercube, hypertree, lambda, omega, multidrop bus, and multistage cube, among others.

Networked computer system 10 is preferably a multiprocessor system having a distributed shared memory system, which is also known as a non-uniform memory access, or NUMA system, where a single address space is distributed among multiple nodes. Each node 20 in the system therefore includes one or more processors, as well as a portion of the main memory for the entire system. It should be appreciated, however, that the principles of the invention also may apply to distributed computer systems having independent computers interconnected via a network, e.g., where each node may be a stand-alone computer, as well as to non-distributed memory multiprocessor systems. Therefore, it should be understood that the invention is not limited to any particular hardware architecture or network topology.

Node A is shown in greater detail in FIG. 2, and generally includes coupling hub 30, a plurality of processors or processing units 26, dynamic memory 24 and input/output interface 28, all interconnected via a local bus including address bus 22 and data bus 23.

Any number of processing units 26, e.g. from one to sixteen, preferably four, may be utilized in each node. Each processing unit preferably includes a microprocessor, e.g., the PowerPC® RISC processor available from International Business Machines, as well as a cache memory dedicated to the microprocessor, e.g., a two Megabyte SRAM cache. It should be appreciated that additional support circuitry, e.g., clock circuitry, bus interface circuitry, power supply circuitry, etc. may be included in each processing unit as required. Moreover, any number of available hardware devices and systems may be used in the alternative.

A dynamic memory 24 is interconnected to processing units 26 through busses 22 and 23. The memory 24 in each node comprises a portion of the overall memory for system 10, and is preferably a one Gigabyte DRAM memory array. However, it should be appreciated that the type and size of memory required will vary depending upon system requirements, the number of nodes, etc.

An input/output interface 28 is also connected to busses 22 and 23 to provide communication with various peripheral devices that may be connected to node A, e.g., mass storage devices, imaging devices, display devices, user input devices, multimedia devices, network adapters, among others. The particular peripheral devices will vary depending upon system requirements.

Coupling hub 30 interconnects node A with the other nodes 20 in system 10, primarily by providing the interface between network 15 and the local bus 22, 23. Coupling hub 30 generally includes a command processor 32 and a network interface 36 having a packet receiver 40 and a packet transmitter 50 for handling data traffic with the other nodes 20 in system 10. Moreover, coupling hub 30 includes a partitioned global coherence directory 34 which is utilized by command processor 32 to maintain memory coherence across the distributed shared memory system by keeping a complete record of all memory locations that are being held in caches in other nodes in system 10.

Included within its responsibilities, coupling hub 30 serves as an agent to the local processing units when they are attempting to access remote memory locations not physically resident in memory 24 of node A. Coupling hub 30 also operates as a proxy snooper for all of the remote processing units when accesses are placed on the local bus 22, 23. It should be appreciated that the term "local" when used herein refers to processors, memory locations, etc. that are found within the same node as a particular coupling hub. Similarly, the term "remote" when used herein refers to such elements that are found within different nodes in system 10.

Generally, when a local processing unit 26 attempts to access a remote memory location, the coupling hubs 30 in both the local and remote nodes together act as memory agents to get requested data from the memory of the remote node to the cache of the local processing unit. The local coupling hub 30 continuously snoops the local bus 22, 23 to recognize a remote memory access by a local processing unit, and when detected, forwards the request to the particular remote node for the requested memory access. The coupling hub for the remote node then places the request on its local bus, obtains the requested memory access, and forwards the data response back to the local coupling node, which then places the data on the local bus for use by the local processing unit that made the original request. The remote coupling hub also makes a record in its dedicated coherence directory to indicate that the memory locations transmitted to the local node are cached off-node. Consequently, other than the additional latency, the remote memory access is no different than a local memory access for each local processing unit.

As discussed above, the coupling hub 30 also monitors, or snoops, local bus traffic on behalf of all remote processing units in system 10, similar to the manner in which other local processing units snoop a local bus to maintain coherence in their dedicated cache memories. Thus, when a coupling hub 30 detects that a local processing unit is modifying a memory location, the coupling hub determines whether the memory location is cached elsewhere in system 10. If so, the coupling hub sends invalidation or purge requests to each remote node having a cached copy of the memory location so that the remote nodes recognize that the cached copies are no longer current copies of the data in the particular memory location, thereby maintaining memory coherence throughout system 10.

Partitioned global coherence directory 34 is preferably a record-based directory, where records or entries are maintained for subsets of memory (preferably 128 byte lines or blocks) that are cached by processing units in the system. The directory is preferably allocated space for 256K three byte records, although the size and number of records may vary. Each record preferably includes an address or pointer to a memory subset, and a plurality of state bits indicating the current coherence state of the memory and where the memory is cached. The coherence state is preferably maintained using the MESI (Modified, Exclusive, Shared, Invalid) coherence protocol, or alternatively, a modified MESI protocol where the exclusive and modified states are combined into a single state. Alternatively, coherence directory 34 may be a bit-vector directory containing dedicated status bits or groups of bits for every subset of memory in system 10.

Network interface 36 preferably includes packet receiver 40 and packet transmitter 50, both of which cooperate to handle the transmission of packets into and out of the node. Packet receiver 40 processes packets received by node A. Receiver 40 includes incoming packet transport logic block 42 which handles the connection and interface with network 15, here specifically from Node B. Incoming block 42 preferably formats an incoming packet, determines if it is destined for the node, and if so, passes the incoming packet to one of three receive buffers or queues 44, 46 and 48, each of which separately stores incoming packets from one of three separate classes.

As discussed above, packets are preferably classified into three classes. The first class, handled by buffer 44, is for primary requests, which in this case are typically requests from remote nodes for memory accesses to a memory location or block allocated to the local node. The second class, handled by buffer 46, is for secondary requests, which in this case are typically invalidation requests to the local node to invalidate local cache copies of a memory location or block. The third class, handled by buffer 48, is for responses. Each buffer is preferably a first-in, first-out (FIFO) buffer of eight entries of 160 bytes each, although the number and size of entries may vary.

Figure 1:
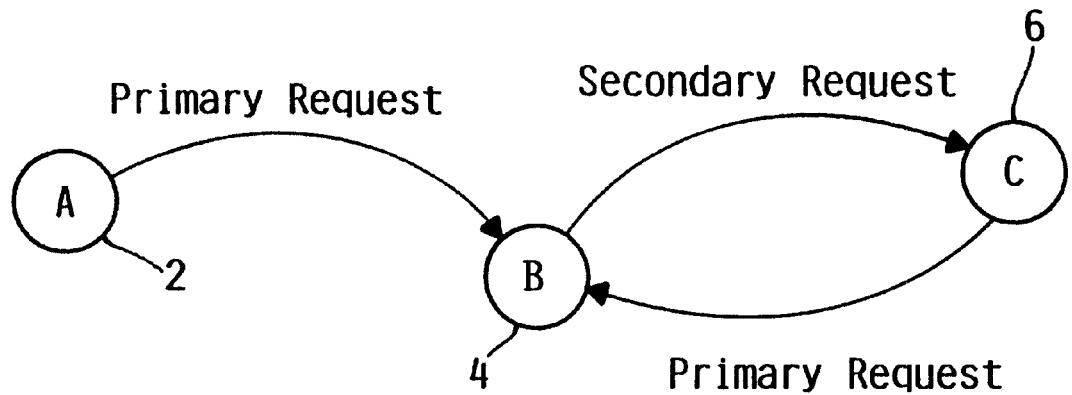
FIG. 1 is a functional diagram illustrating a request—request deadlock condition in a conventional networked computer system.
Figure 3:
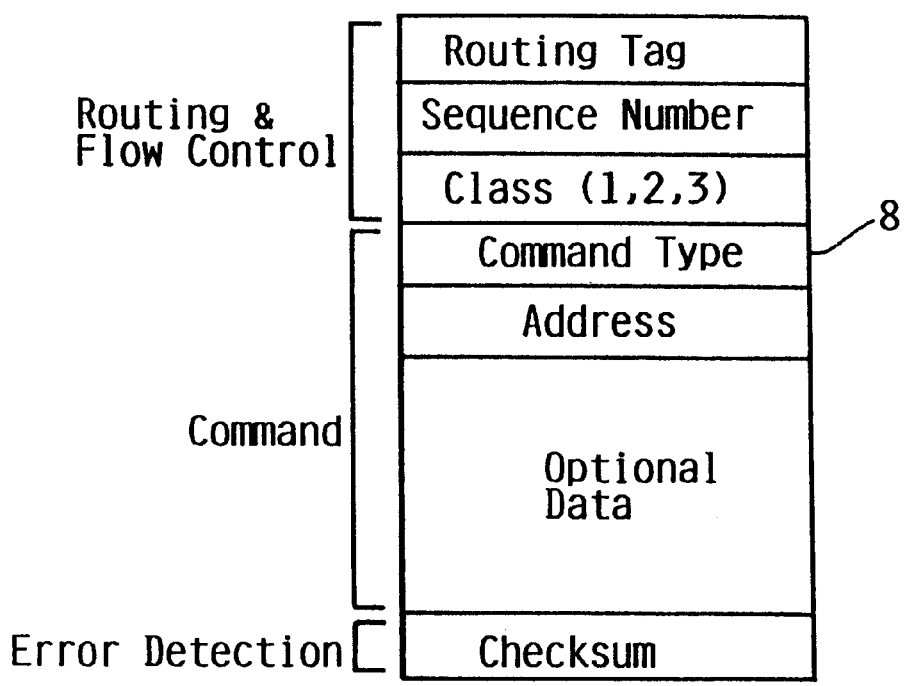
FIG. 3 is an illustration of a packet for use with the system of FIG. 2.

The packets in the second class are preferably non-propagable, meaning that they may be processed locally by the node without additional processing from other nodes in the system. As will be seen below, this ensures that packets in the second class will always be processed regardless of whether the processing of any packets in other classes is held up by the coupling hub. Classification of incoming packets is preferably determined by incoming block 42 by checking a dedicated class identifier in the packet. For example, a typical packet 8 suitable for use in system 10 is illustrated in FIG. 3. Packet 8 is generally broken into three primary components. First, a routing and flow control component includes a routing tag which provides the destination node ID as well as the source ID for the issuing node. A sequence number is also provided to maintain ordering in a chain of requests. Further, a class identifier (here 1, 2 or 3) is provided to identify the packet as a primary (class 1) request, a secondary or non-propagable (class 2) request, or a (class 3) response.

A command component of packet 8 includes the actual "payload" of the packet, with the command type, the operative address of the requested memory, and any optional data that is to be passed within the packet. Finally, an error detection component, typically including some form of checksum, is usually provided to check for proper transmission of packets throughout the system. It should be appreciated that numerous alternate packet formats may be used consistent with the invention.

Other manners of identifying and separating packets of different classes may be used in the alternative. For example, the packets in each class may be passed between nodes using completely separate networks and interfaces, whereby three separate networks would be required between all of the nodes. Moreover, packet class information may be encoded within other fields in the packet, e.g., within the command type, whereby the class would be recognizable based upon the type of command specified in the packet.

Returning to FIG. 2, packet transmitter 50 includes an outgoing packet transport logic block 52 coupled to command processor 32 through three transmit buffers or queues 54, 56, 58. Transmitter 50 operates to output packets to other nodes in system 10, utilizing outgoing block 52 to communicate with network 15 and properly format an outgoing packet into a compatible protocol for the network. Outgoing block 52 also receives and retransmits any packets received by incoming block 42 which are destined for another node in the system.

Buffers 54, 56 and 58 are similar in configuration to buffers 44, 46 and 48, and they respectively handle packets in the first, second and third classes. Buffers 44 and 54, 46 and 56 and 48 and 58 thus form "sets" of buffers for handling incoming and outgoing packets in each class.

Incoming and outgoing blocks 42 and 52 are preferably configured to communicate with other nodes of the network using a modified Scaleable Coherent Interface (SCI) protocol (IEEE 1596-1992), which is adapted to handle the three classes of packets disclosed herein. However, it should be appreciated that other suitable network communication protocols may also be used.

As discussed above, the processing and communication of packets in a networked environment is in general conventional in nature, as is the maintenance and control of memory coherence throughout a distributed shared memory system. Thus, the hardware and programming necessary to implement packet-based communication and memory coherence in the preferred embodiments could be developed by one of ordinary skill in the art without further explanation herein. See, for example, Lenoski et al., "The Stanford Dash Multiprocessor", IEEE Computer, March 1992, pp. 63–79., or U.S. Pat. No. 5,444,701 to Cypher et al., both of which are incorporated by reference herein.

Figure 5:
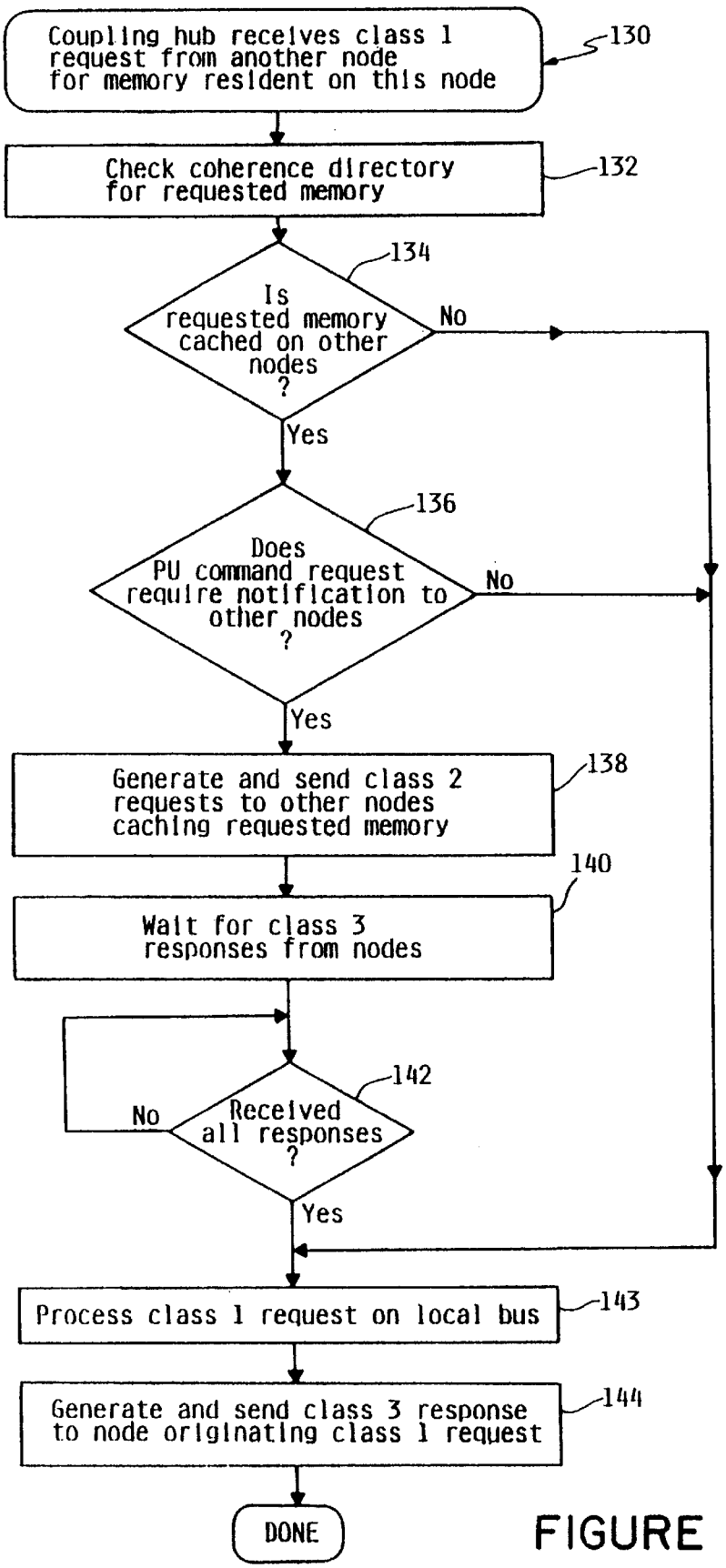
FIG. 5 is a flowchart illustrating a preferred class 1 request processing routine performed by the command processor in node A of the system of FIG. 2.
Figure 6:
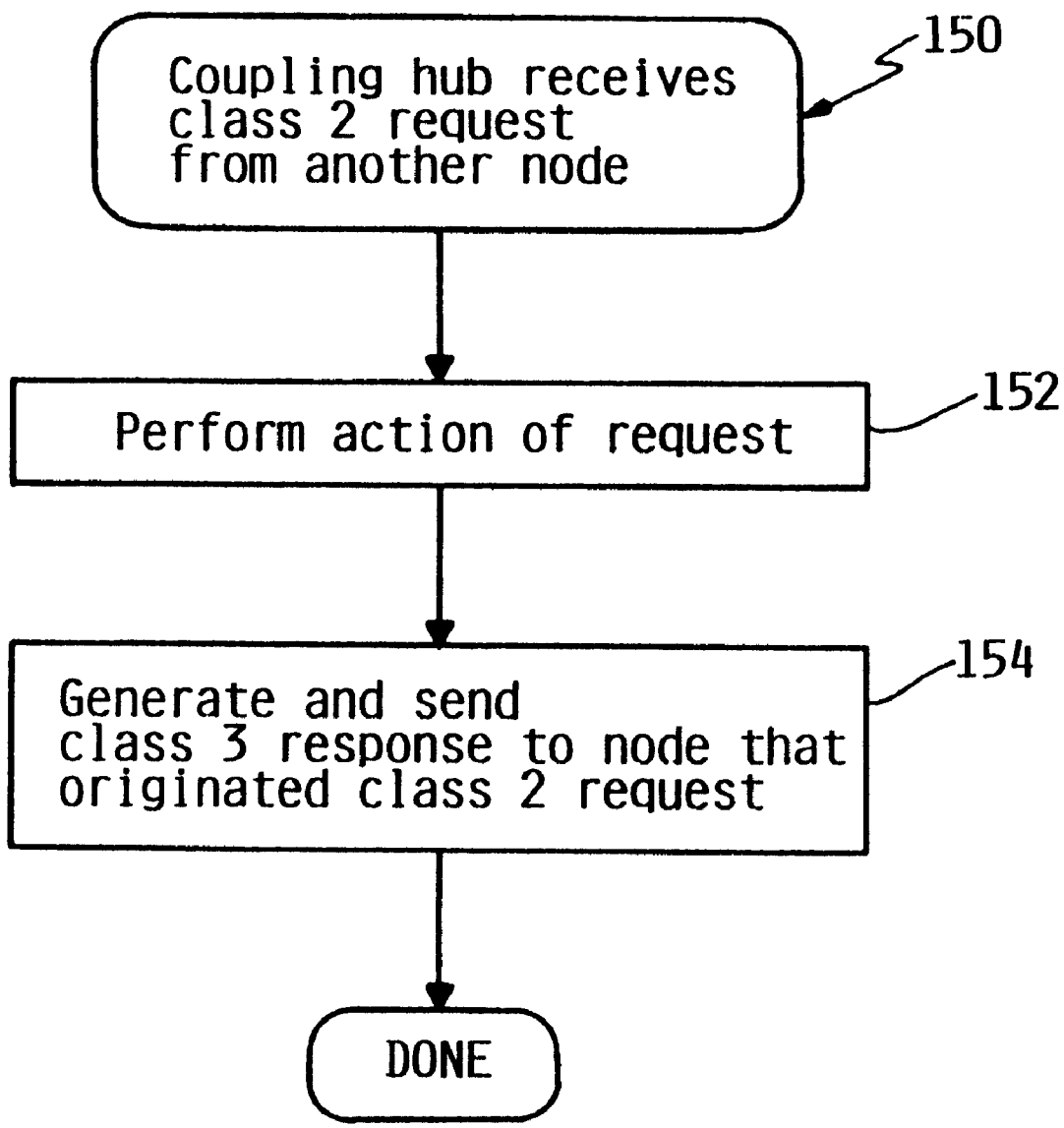
FIG. 6 is a flowchart illustrating a preferred class 2 request processing routine performed by the command processor in node A of the system of FIG. 2.

Command processor 32 handles the overall operation of coupling hub 30 in snooping the local bus and handling data traffic with remote nodes. The operation of the command processor is generally illustrated in FIGS. 4–6.

Figure 4:
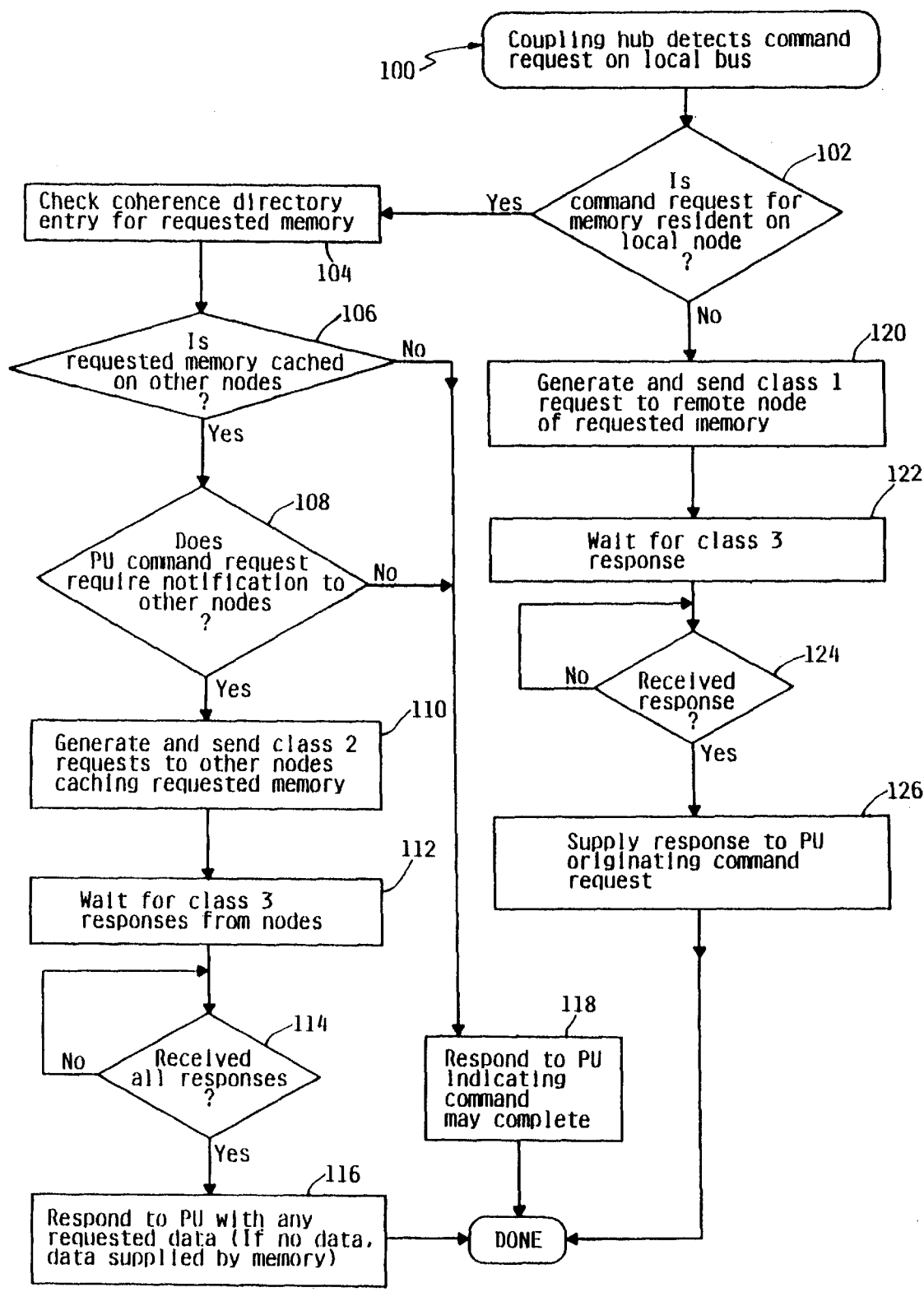
FIG. 4 is a flowchart illustrating a preferred snooping routine performed by the command processor in node A of the system of FIG. 2.

FIG. 4 illustrates the "snooping" operation of command processor 32 in greater detail, shown as routine 100. In particular, whenever a command request, e.g., a load or store operation, is placed on local bus 22, 23 by one of the processing units 26, command processor 32, as well as the other processing units, detects the request. Routine 100 begins at block 102, where the command processor determines whether the command request requires memory access to memory resident on the local node (i.e., whether the particular memory requested in physically allocated to memory 24 of node A). If so, block 104 is executed to access coherence directory 34 to determine if the requested memory is cached on any other nodes 20 in system 10. If not, block 106 passes control to block 118, where command processor 32 responds to the processing unit 26 that issued the command request to indicate that the command may complete, and that any data requested will be placed on local bus 22, 23 from memory 24. Processing of the command request by command processor 32 is then complete.

Returning to block 106, if the requested memory is cached on a remote node, block 108 checks if the particular command request requires notification to the other nodes caching the requested memory. If not, control also passes to block 118.

If so, however, control passes to block 110 to notify the remote nodes. Generally, notification is required whenever a store operation or a read-exclusive operation is requested by a local processing unit, since in either case, the copies of the requested memory cached in other nodes will not contain current data and must be invalidated to maintain memory coherence. Notification may be required for other commands, e.g., specific cache management commands.

These "invalidation" requests to the remote nodes are generated in block 110 as class 2 requests, since they are non-propagable and may be handled exclusively at the destination nodes. Once this occurs, a loop in blocks 112–114 is executed to wait until all class 3 responses have been received from all of the remote nodes having cached copies of the requested memory. It is only after all responses have been received that control passes to block 116 to respond to the requesting processing unit with any requested data (if such data was included in a response), or to alert the processing unit that the data will be supplied by memory 24 over local bus 22, 23. Processing of the command request by command processor 32 is then complete.

Now returning to block 102, if the snooping operation of command processor 32 determines that a command request has been issued that requests memory not resident on the local node, control passes to block 120 to generate and transmit an appropriate class 1 or primary request to the remote node with the requested memory. Then, in blocks 122–124, a loop is executed to wait until an appropriate class 3 response is returned from the home node for the requested memory. Once the response is received, block 126 supplies an appropriate response to the requesting processing unit, including any data received with the response. Processing of the command request by command processor 32 is then complete.

FIGS. 5 and 6 illustrates the incoming data traffic control by command processor 32. As discussed above, class 1 (primary) requests and class 2 (secondary, or non-propagable) requests are handled separately to avoid deadlock. The processing of incoming class 1 requests is illustrated in FIG. 5 by routine 130, which begins in block 132 by checking coherence directory 34 for the requested memory specified in the incoming class 1 primary request. Next, in blocks 134 and 136, the command processor determines first, if the requested memory is cached on any other nodes in the system, and second, if it is, whether the particular class 1 primary request requires that the other nodes by notified. If both conditions are met, control passes to block 138. This could occur, for example, if a cached copy in other node contains the most up-to-date copy of the data (when a read is requested) or if the cached copies need be invalidated (when a store or exclusive read is requested).

In block 138, appropriate class 2 (non-propagable) requests are generated and transmitted to the other nodes in system 10 that have cached copies of the requested memory and are required to be notified for the particular request. Next, in blocks 140–142, a loop is executed to wait until all class 3 responses are received from the nodes to which class 2 requests were sent.

When all of the class 3 responses have been received, block 144 is executed to generate and transmit an appropriate class 3 response to the node that originated the original class 1 request. Any requested data from this or another node may be supplied with the response as necessary.

Returning to blocks 134–136, if there are no remote nodes that must be notified, control passes directly to block 144 to generate and send an appropriate class 3 response. Once block 144 is terminated, processing of the primary request is completed by command processor 32.

The processing of incoming class 2 (secondary) requests is illustrated by routine 150 of FIG. 6. First, in block 152, the action indicated in the class 2 request is performed, e.g., invalidating cached copies of requested memory in particular processing units in the node, or providing the most up-to-date copy of requested memory from the cache of one of the processing units on the node. Then, in block 154, an appropriate class 3 response is generated and transmitted to the node that generated the class 2 request. Any requested data may be supplied in the response if necessary. Processing of the class 2 request is then completed.

As will be appreciated, because class 2 requests are non-propagable, no further processing or information is required by other nodes in the network other than the node which receives the class 2 request. Consequently, processing of the class 2 requests is greatly simplified compared to class 1 requests. It should be noted that no loops are executed in routine 150 to wait for responses from other nodes in system 10. Accordingly, deadlock is not possible with these responses since an inability of a remote node to provide an appropriate response does not stall such a process or routine.

Various modifications may be made to the preferred embodiments. For example, additional request, response and/or other command classes may be utilized, or responses may not be used in a particular protocol. Moreover, non-propagable responses or other commands may be handled separately in a manner consistent with the invention, and multiple classes of non-propagable commands may be defined.

Additional modifications may be made to the preferred embodiments without departing from the spirit and scope of the invention. Therefore, the invention lies in the claims hereinafter appended.

What is claimed is:

1. A method of communicating between a plurality of nodes in a networked computer the method comprising the steps of:
   (a) classifying request packets in one of at least first and second classes, wherein the request packets in the second class are non-propagable requests that are handled locally by destination nodes in the computer system;
   (b) separately processing request packets in the first and second classes by accepting into and processing request packets of the second class in a node irrespective of whether the node is accepting packets in the first class; and
   (c) routing request packets of the first class independent of routing request packets of the second class between the plurality of nodes, respectively through first and second sets of buffers in each node.

2. The method of claim 1, wherein each set of buffers includes a transmit and a receive buffer.

3. The method of claim 1, wherein the networked computer system is a multiprocessor system with a distributed shared memory, wherein each node includes at least one microprocessor and a memory, the method further comprising the step of issuing a primary request, as a request packet in the first class, to a destination node for a memory access to a requested block of memory resident in the memory of the destination node.

4. The method of claim 3, wherein each node includes at east one cache memory for storing copies of memory blocks in the computer system, the method further comprising the step of, in response to the primary request, issuing at least one secondary request, as a request packet in the second class, to a node having a cache memory with a copy of the requested block of memory to invalidate the copy of the requested block of memory in the cache memory.

5. A node for use in a networked computer system which includes a plurality of nodes interconnected via a network to pass request packets therebetween, the request packets classified into first and second classes, with the request packets in the second class being non-propagable requests that are handled locally by destination nodes in the computer system, the node comprising:
   (a) a network interface coupled to the network, comprising first and second sets of transmit and receive buffers for processing request packets in the first class and request packets in the second class, respectively; and
   (b) a command processor coupled to the network interface for processing request packets received by the network interface, the command processor separately handling request packets in the first and second classes such that request packets in the second class are processed irrespective of whether the command processor is accepting request packets in the first class, the command processor further routing request packets of the first class independent of routing request packets of the second class between the plurality of nodes, respectively through first and second sets of buffers in each node.

6. The node of claim 5, wherein the network interface further receives response packets from the network, and wherein the command processor separately handles the response packets received by the network interface.

7. The node of claim 6, wherein the network interface comprises a third set of transmit and receive buffers for process response packets.

8. The node of claim 7, further comprising a processing unit and a memory interconnected to the command processor over a local bus.

9. The node of claim 8, further comprising a second processing unit interconnected to the local bus.

10. The node of claim 8, wherein the command processor, in response to a memory access request from the processing unit to a requested memory address in another node of the computer system, issues a primary request, as a request packet in the first class, to the node in which the requested memory address resides.

11. The node of claim 10, wherein the computer system is a distributed shared memory system having a system memory with a plurality of memory blocks allocated to the memory in each node, and wherein the processing unit includes a cache memory for storing local copies of memory blocks in the system memory, the node further comprising a coherence directory for storing status information for the memory blocks in the system memory, and wherein, in response to a primary request received by the network interface for a requested memory block, the command processor issues at least one secondary request, as a request packet in the second class, to a node having a cache memory with a copy of the requested memory block to invalidate the copy of the requested memory block.

12. A networked computer system comprising a plurality of nodes interconnected via a network, each node comprising:

(a) a first set of buffers for storing a first class of propagable command packets;

(b) a second set of buffers for storing a second class of non-propagable command packets; and (c) a command processor, coupled to the first and second sets of buffers, for processing command packets, the command processor separately handling command packets in the first and second classes such that command packets in the second class are processed irrespective of whether the command processor is accepting command packets in the first class, the command processor further routing request packets of the first class independent of routing request packets of the second class between the plurality of nodes, respectively through first and second sets of buffers in each node.

13. The computer system of claim 12, wherein the first and second classes of command packets are request packets, the computer system further comprising a third set of buffers for storing response packets, wherein the command processor generates response packets in reply to request packets received by the command processor.

14. The computer system of claim 13, wherein the request packets in the second class of non-propagable commands are requests that are handled locally by destination nodes in the computer system.

15. The computer system of claim 14, wherein the networked computer system is a multiprocessor system with a distributed shared system memory, wherein each node includes at least one processing unit and a memory interconnected via a local bus, the system memory having a plural of memory blocks allocated to the memory of each node, and wherein the command processor in each node issues primary requests, as request packets in the first class, to destination nodes for memory accesses to requested blocks of memory resident in the memories of the destination nodes.

16. The computer system of claim 15, wherein each node further comprises a second processing unit interconnected to the local bus.

17. The computer system of claim 15, wherein the processing unit in each node includes a cache memory for storing local copies of memory blocks in the system memory, each node further comprising a directory for storing status information for the memory blocks in the system memory, and wherein, in response to a primary request received at a node, the command processor of the node issues at least one secondary request, as a request packet in the second class, to a node having a cache memory with a copy of the requested memory block to invalidate the copy of the requested memory block.

18. A node for use in a networked computer system having a plurality of nodes interconnected to pass request packets therebetween, the node comprising:

a network interface for receiving and sending request packets to one or more but less than all other nodes in the networked computer system such that a particular request packet may need to be passed through one or more intermediate nodes to reach a destination node; and a command processor, coupled to the network interface, for processing request packets received by the network interface, the command processor handling request packets, classified in a first class, separate from request packets, classified in a second class, such that the command processor processes the request packets in the second class when the command processor is accepting request packets in the first class and when the command processor is declining request packets in the first class, the command processor further routing request packets of the first class independent of routing request packets of the second class between the plurality of nodes, respectively through first and second sets of buffers in each node.

19. The node of claim 18, wherein the request packets in the first and second classes each include a class identifier identifying whether the request packet is classified in the first or second class, each class identifier being transmitted between nodes with the respective request packet.

20. The node of claim 18, wherein the request packets in the second class include only non-propagable request packets.

* * * * *